March 18, 1969  J. R. KREMIDAS ET AL  3,433,241
PRESSURE LIMITING DEVICE
Filed Nov. 17, 1966
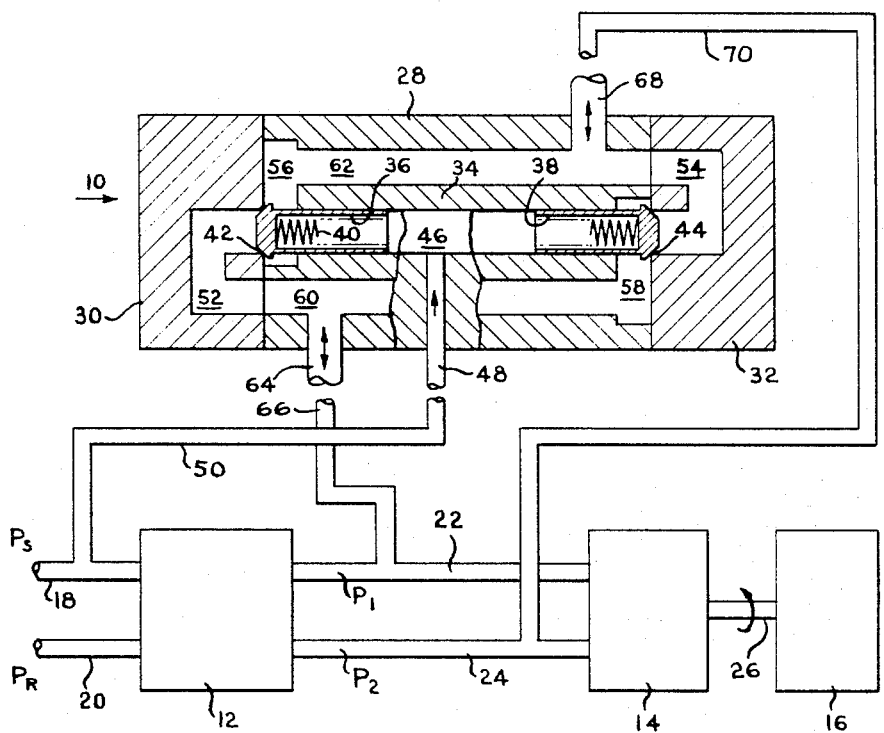
D. B. KANTZ
J. R. KREMIDAS
INVENTORS.
BY W. S. Thompson

United States Patent Office 3,433,241
Patented Mar. 18, 1969

3,433,241
PRESSURE LIMITING DEVICE
James R. Kremidas, Livonia, and Don B. Kantz, Ferndale, Mich., assignors to The Bendix Corporation, a corporation of Delaware
Filed Nov. 17, 1966, Ser. No. 595,081
U.S. Cl. 137—112                         4 Claims
Int. Cl. G05d *11/00;* F16k *15/00, 17/00*

ABSTRACT OF THE DISCLOSURE

A pressure limiting valve means for use with hydraulic servo-valve motor systems. Line pressure surges are prevented when the servo-valve is centered and the motor is running at high speed by providing two normally closed valve crossover connections between the motor delivery passages which open when the pressure goes above the supply pressure. When a valve opens, fluid is allowed to recirculate through the motor.

---

The present invention relates to pressure limiting device or valve means particularly adapted for use with hydraulic servo-valve motor systems.

In hydraulic control circuits where large load inertias are present, provision must be made to limit destructive line pressure surges in the event that the servo valve is centered when the motor is running at high speed. This situation would result in the load inertia driving the motor as a pump until motion stopped. The fluid leaving the pump (motor) would enter a constant volume chamber with only minimal leakage past the pump (motor) and servo-valve, generating unsafe destructive pressures.

Prior means to alleviate this problem consists of pressure regulators in each motor line which limit pressure to a predetermined level. Also, the use of four-way valves in conjunction with a pressure regulator which bypasses the servo-valve when the motor fluid supply is cut off is known. Both approaches are bulky, costly and subject the system to cavitation problems, and in general are not responsive to changes in supply pressure.

It is an object of the present invention to provide hydraulic limit valve means operative to relieve high line pressures developed by inertia loads or the like.

It is another object of the present invention to provide hydraulic limit valve means operative to recirculate fluid through an hydraulic inertia driven motor member to prevent cavitation in fluid system lines.

It is another object of the present invention to provide hydraulic limit valve means referenced by supply pressure and thereby provide release at a certain ratio of supply pressure.

Other objects and advantages will become apparent on consideration of the accompanying description and drawing.

Referring to the drawing, our pressure limiting valve means is generally designated by numeral 10. A typical hydraulic system with which our invention may be used with great advantage is comprised of an hydraulic servo-valve 12, an hydraulic motor 14 and a driven or load device 16. Supply pressure $P_s$ is supplied by inlet conduit 18 to the hydraulic servo-valve 12 and lower pressure return fluid $P_r$ is returned to the source by return conduit 20.

The hydraulic servo valve may be of any known type, for example, such as that shown and described in commonly assigned U.S. Patent 2,964,018, issued Dec. 13, 1960, in the name of John R. Farron. Basically, the servo operates to control or select delivery pressure to one of two valve delivery passages 22 and 24 in response to a control signal. $P_1$ fluid is designated in delivery passage 22, and $P_2$ fluid in delivery passage 24. The servo-valve may selectively connect passages 18 and 22, and passages 20 and 24 to achieve one direction of rotation of motor 14. For opposite rotation, passages 18 and 24 are connected, and passages 20 and 22 are connected. The valve has a centered position substantially shutting the connections for a stable non-motion condition.

Hydraulic motor 14 may, in like manner, be of many types responsive to a hydraulic driving fluid which propels a rotor which drives shaft 26 and thus load 16. For example, a vane type cam motor of the type illustrated in commonly assigned U.S. Patent 2,985,110, issued May 23, 1961, in the names of F. B. Burt. C. B. Sung and J. R. Farron, may effectively be used as the motor element.

In the type of hydraulic system described, the system may be called upon to rapidly traverse load 16, and then come to a quick stop or reversal of motion in an opposite direction. For a brief transient condition, the inertia of load 16 will drive motor 14 as a pump. Since there is small leakage in the motor and servo valve, desirably so for precision during normal operations, fluid pressure $P_1$ or $P_2$ will quickly build up to an unsafe value, depending on the direction of rotation.

To meet this problem, limit valve device 10 of our invention is comprised of a housing 28 and two end plates 30 and 32. Housing 28 has a central cylindrical bore 34 in which are slidably arranged two oppositely directed poppet valves 36 and 38 urged by a common spring 40 against valve seats 42 and 44 in end plates 30 and 32, respectively. The poppet valves 36 and 38 and cylindrical bore 34 thus form a closed fluid chamber 46 which receives supply pressure $P_s$ as a valve reference pressure through passage 48 which is adapted to be connected with conduit 50.

Each end plate 30 and 32 have a fluid chamber 52 and 54 formed therein communicating with the upstream side of valve seats 42 and 44, respectively. Housing 28 has fluid chambers 56 and 58 communicating with the downstream sides of valve seats 42 and 44, respectively. Upstream chamber 52 is cross connected with downstream chamber 58 by crossover passage 60, whereas crossover passage 62 similarly connects chambers 54 and 56. Passage 64 is adapted to be connected to passage 66 and thus connect chambers 52 and 58 through crossover passage 60 with $P_1$ fluid from line 22. Passage 68 is adapted to be connected to passage 70 to supply $P_2$ fluid to chambers 54 and 56 through crossover passage 62.

The arrangement provides two normally closed valve crossover connections between motor delivery passages 22 and 24, while requiring only one connection with each delivery passage. Each valve is referenced to its normally closed position by supply pressure $P_s$ to remain inoperative except when inertia of load 16 causes motor 14 to operate as a pump. In such an event, the pressure in one of the lines 22, 24 will sharply increase above supply pressure. For example, assume the load has been rapidly traversing and the servo-valve then is abruptly placed in its centered position. Inertia of load 16 will drive motor 14, and it may be assumed for a given direction of rotation increases $P_1$ pressure above $P_s$. This produces an opening force on poppet valve 36 connecting chambers 52 and 56, and thus lines 22 and 24. This operation permits fluid to recirculate through motor 14 (now a pump) relieving pressure and preventing cavitation by fluid starvation. Of course, if motor 14 were driven in the reverse direction, $P_2$ would exceed $P_s$, causing poppet valve 38 to open, permitting reverse circulation in a similar manner.

In one form of the invention, spring 40 is very light or may be omitted and the poppet valves designed to have equal areas so that only slight inertia caused pressure increases will be relieved. In other applications, it may be desired to permit $P_1$ or $P_2$ to exceed supply pressure a known amount before valve opening to provide a greater, but safe, head against which the motor must pump, thus more efficiently braking the inertia load.

Reference to supply pressure provides a device which will release either at a supply pressure or a certain ratio or percentage above, thus permitting the system to accommodate for variations in $P_s$.

A preferred form of the invention has been shown and described, however, it will be understood that variations may be made in the specific structure without departing from the scope of the invention as defined in the appended claims. In particular, it will be understood that the limit device may be formed in either the valve or motor housing, or sandwiched in between with part in each. The poppet valves have been arranged in opposed relationship to make common use of spring 40, but are operative in similar functional manner, either without spring or with two springs, and in different physical orientation.

We claim:
1. A pressure limiting device for use with an hydraulic servo-valve with fluid supply and return means, and a two directional hydraulic motor connected by a pair of delivery passages with said servo-valve; said pressure limiting device comprising:
   first and second fluid passage means cross connecting the pair of delivery passages;
   first and second fluid pressure responsive normally closed valve means operative with said first and second fluid passage means to normally prevent fluid flow therethrough;
   said first valve means responsive to the pressure difference between supply pressure and the pressure in one of the pair of delivery passages to open and cross connect said pair of delivery passages when supply pressure is exceeded in said one of the pair of delivery passages; and
   said second valve means responsive to the pressure difference between supply pressure and the pressure in the other of the pair of delivery passages to open and cross connect said pair of delivery passages when supply pressure is exceeded in the other of said pair of delivery passages.

2. A pressure limiting device as claimed in claim 1 wherein:
   said first fluid passage means includes a first cross-over passage connecting the upstream side of said first valve means with the downstream side of said second valve means, and
   said second fluid passage means includes a second crossover passage connecting the upstream side of said second valve means with the downstream side of said first valve means.

3. A pressure limiting device as claimed in claim 1 including spring means normally biasing said first and second valve means to a normally closed position.

4. A pressure limiting device as claimed in claim 1 wherein:
   said first and second valve means are arranged in opposed positions in a common cylindrical bore forming a reference chamber therebetween, and
   supply pressure passage means adapted to supply pressure to said reference chamber.

References Cited

UNITED STATES PATENTS

| | | | |
|---|---|---|---|
| 2,311,851 | 2/1943 | McClure | 251—358 XR |
| 3,073,332 | 1/1963 | Strader | 137—112 |
| 3,107,681 | 10/1963 | May | 137—112 |
| 3,145,723 | 8/1964 | Chorkey | 137—112 |
| 3,155,105 | 11/1964 | Yanna | 137—112 |
| 3,160,168 | 12/1964 | Kowalski et al. | 137—112 |
| 3,282,284 | 11/1966 | Harris et al. | 137—112 XR |
| 3,348,563 | 10/1967 | Sidles | 137—119 XR |

STANLEY N. GILREATH, *Primary Examiner.*

W. H. SCHROEDER, *Assistant Examiner.*

U.S. Cl. X.R.

137—512.5